(12) United States Patent
Sato (10) Patent No.: US 7,839,435 B2
(45) Date of Patent: Nov. 23, 2010

(54) IMAGE SENSING APPARATUS AND IMAGE SENSING METHOD

(75) Inventor: Yoshinobu Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 10/443,345

(22) Filed: May 22, 2003

(65) Prior Publication Data

US 2003/0218687 A1 Nov. 27, 2003

(30) Foreign Application Priority Data

May 23, 2002 (JP) ............................. 2002-149249

(51) Int. Cl.
*H04N 5/228* (2006.01)

(52) U.S. Cl. .............. 348/222.1; 348/224.1; 348/225.1; 348/226.1; 348/227.1

(58) Field of Classification Search ............. 348/222.1, 348/224.1–229.1, 362
See application file for complete search history.

(56) References Cited

U.S. PATENT DOCUMENTS

| 5,093,716 A | * | 3/1992 | Kondo et al. | ............. 348/224.1 |
|---|---|---|---|---|
| 5,703,644 A | * | 12/1997 | Mori et al. | ................... 348/363 |
| 6,118,485 A | * | 9/2000 | Hinoue et al. | ................ 348/373 |
| 6,359,837 B1 | * | 3/2002 | Tsukamoto | ................... 368/10 |
| 6,831,695 B1 | * | 12/2004 | Tamayama | ................... 348/362 |
| 2002/0171747 A1 | * | 11/2002 | Niikawa et al. | ......... 348/333.01 |

FOREIGN PATENT DOCUMENTS

| JP | 11-341331 | 12/1999 |
|---|---|---|
| JP | 2000-78445 | 3/2000 |
| JP | 2001-251540 | 9/2001 |
| JP | 2001-358981 | 12/2001 |

* cited by examiner

*Primary Examiner*—Yogesh K Aggarwal
(74) *Attorney, Agent, or Firm*—Cowan, Liebowitz & Latman, P.C.

(57) ABSTRACT

An object of this invention is to allow quickly, reliably confirming an in-focus state with a simple arrangement. To achieve this object, an image sensing apparatus includes an image sensing element which photoelectrically converts an object image, a first image generation unit which generates a first image obtained from the image sensing element, a second image generation unit which generates a second image of a predetermined region from the image obtained by the image sensing element, and an exposure control unit which controls exposure so as to set the second image to appropriate brightness.

7 Claims, 8 Drawing Sheets

IMAGE SENSING APPARATUS AND IMAGE SENSING METHOD

FIELD OF THE INVENTION

The present invention relates to an image sensing apparatus such as an electronic camera, and an image sensing method applied to the apparatus.

BACKGROUND OF THE INVENTION

The number of pixels of a solid-state image sensing element used in an electronic camera such as a digital camera is at least 1,500,000 to 3,000,000 at maximum. The number of pixels tends to increase. The number of pixels of a liquid crystal monitor attached to the electronic camera is 60,000 to 100,000 at most.

To use the liquid crystal monitor having a small number of pixels as a viewfinder, a focus state at a precision necessary for recording or printout cannot be confirmed. An out-of-focus state is recognized only when an image sensed by the electronic camera is displayed on the screen of a personal computer or printed out by a printer.

From this, there is proposed an image sensing apparatus which generates two types of images from a sensed image, simultaneously displays the two images on the display screen, and allows confirming at a high precision the focus state of an actually sensed image while displaying the whole screen, as disclosed in, e.g., Japanese Patent Laid-Open No. 11-341331.

In such conventional camera apparatus, exposure control during display is performed by so-called average photometry in which the entire sensed image is averaged. In this case, an image for displaying a focus state does not always have appropriate brightness.

For example, if an image for displaying a focus state exceeds the appropriate brightness, the user cannot confirm a focus state at a high precision.

When two images are simultaneously displayed on the display screen, the whole screen display becomes bright depending on an object to be sensed, and it is difficult to concentrate on an image for displaying a focus state.

SUMMARY OF THE INVENTION

The present invention has been made to overcome the conventional drawbacks, and has as its object to allow quickly, reliably confirming an in-focus state with a simple arrangement.

To solve the above problems and achieve the above object, according to the first aspect of the present invention, an image sensing method is characterized by comprising the steps of: photo-electrically converting an object image by an image sensing unit; generating a first image obtained from the image sensing unit by a first image generation unit; generating a second image corresponding to a predetermined region of the object image obtained from the image sensing unit by a second image generation unit; controlling an exposure amount so that the second image become to have appropriate brightness by an exposure control unit; and correcting signal of the first image so that the first image become to have appropriate brightness by a brightness correction unit.

According to the second aspect of the present invention, an image sensing method is characterized by comprising the steps of: photo-electrically converting an object image by an image sensing unit; generating a first image obtained from the image sensing unit by a first image generation unit; generating a second image corresponding to a predetermined region of the object image obtained from the image sensing unit by a second image generation unit; controlling an exposure amount so that the first image become to have appropriate brightness by an exposure control unit; and correcting signal of the second image so that the second image become to have appropriate brightness by a brightness correction unit.

According to the third aspect of the present invention, an image sensing method is characterized by comprising the steps of: photo-electrically converting an object image by an image sensing unit; generating a first image obtained from the image sensing unit by a first image generation unit; generating a second image corresponding to a predetermined region of the object image obtained from the image sensing unit by a second image generation unit; controlling an exposure so that the image become to have appropriate brightness by an exposure control unit; correcting signal of the image so that the image become to have appropriate brightness by a brightness correction unit; and controlling the exposure so that the first image become to have appropriate brightness and controlling to correct the signal of the first image so that the second image become to have appropriate brightness in the case that the first mode is selected, and controlling the exposure so that the second image become to have appropriate brightness and controlling to correct the signal of the first image so that the first image become to have appropriate brightness in the case that the second mode is selected, by a control unit.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described below with reference to the accompanying drawings.

First Embodiment

The first embodiment of the present invention will be described with reference to FIGS. 1 to 5B.

Figure 1:
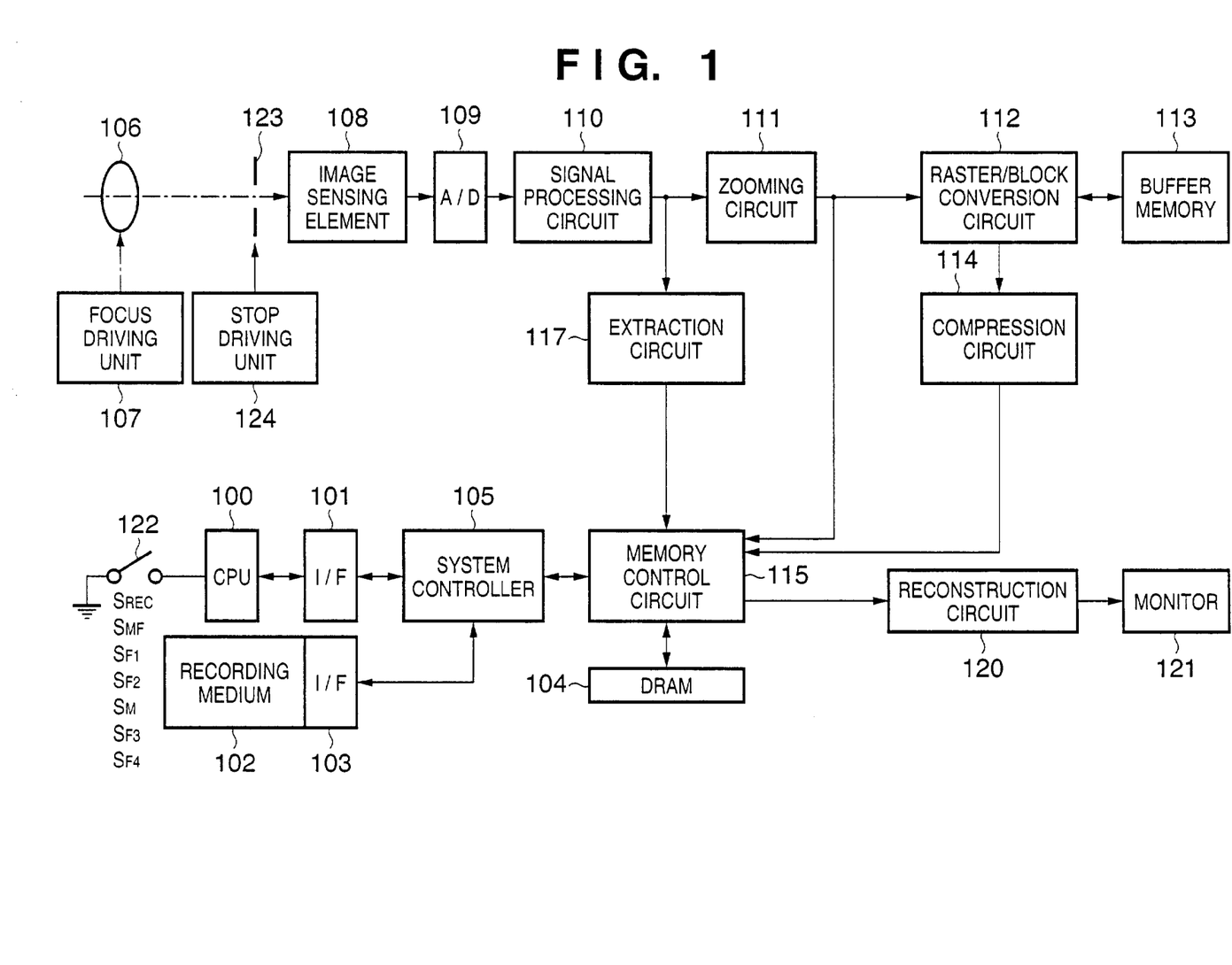
FIG. 1 is a block diagram showing the system configuration of an image sensing apparatus according to the first embodiment of the present invention.

FIG. 1 is a block diagram showing the system configuration of an image sensing apparatus according to the first embodiment. In FIG. 1, reference numeral 100 denotes a CPU (Central Processing Unit) which controls the overall system; 101, an interface circuit (I/F) for the CPU 100; 102, a storage medium such as a memory card; 103, an interface circuit (I/F) for the storage medium 102; 104, a DRAM (Dynamic Random Access Memory) for storing image data, programs, and the like; 105, a system controller which performs sequential control of the system and control such as bus arbitration; 106, an image sensing lens; 107, a focus driving unit; 123, a stop; and 124, a stop driving unit.

Reference numeral 108 denotes an image sensing element which is comprised of a 1-chip CCD (Charge Coupled Device); 109, an A/D converter which converts an analog signal into a digital signal; 110, a signal processing circuit; 111, a reduction circuit (zooming circuit) which reduces pixel data in horizontal and vertical directions by sampling, linear interpolation, and the like; 112, a raster/block conversion circuit which converts raster scan image data zoomed by the reduction circuit 111 into block scan image data; 113, a raster block conversion buffer memory which can convert raster data into block scan data; and 114, a compression circuit which compresses JPEG data for each block.

Reference numeral 115 denotes a memory control circuit which controls an extraction circuit 117, the zooming circuit 111, the compression circuit 114, a reconstruction circuit 120, and the DRAM 104.

The memory control circuit 115 transfers a raster data output from the reduction circuit 111 to the DRAM 104.

The memory control circuit 115 transfers an output from the compression circuit 114 to the DRAM 104.

The extraction circuit 117 extracts an arbitrary region from image data.

The memory control circuit 115 two-dimensionally transfers an output from the extraction circuit 117 to the DRAM 104.

The memory control circuit 115 synthesizes two image data in the DRAM 104, and two-dimensionally transfers the synthesized data to the reconstruction circuit 120 to be described below.

The reconstruction circuit 120 executes modulation, addition of a sync signal, D/A conversion, and the like for image data to generate a video signal. Reference numeral 121 denotes a liquid crystal monitor which serves as a display device and has a smaller number of pixels capable of displaying an output than the number of pixels of an image sensing element; and 122, switches such as a switch $S_{REC}$, switch $S_{MF}$, switch $S_{F1}$, switch $S_{F2}$, switch $S_{F3}$, switch $S_{F4}$, and switch $S_M$.

The switches 122 connected to the CPU 100 will be explained.

The switch $S_{REC}$ is used to designate recording of a sensed image. The switch $S_{REC}$ is turned on, and then a sensed image is recorded on a recording medium. The switch $S_{MF}$ enables manual focusing. The switch $S_{MF}$ is turned on, then the manual focus mode is set, and the switches $S_{F1}$ and $S_{F2}$ are enabled. The switch $S_M$ is used to switch the mode to macro photographing. The switch $S_M$ is turned on, then the macro photographing mode is set, and the switches $S_{F3}$ and $S_{F4}$ are enabled.

Figure 2A:
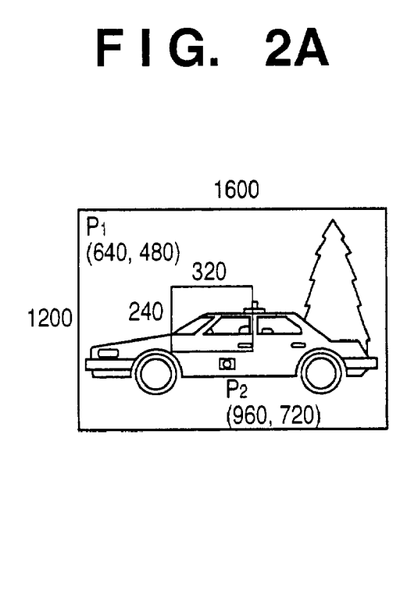
FIGS. 2A to 2C are views for explaining display operation in an MF mode in the image sensing apparatus according to the first embodiment of the present invention.
Figure 2B:
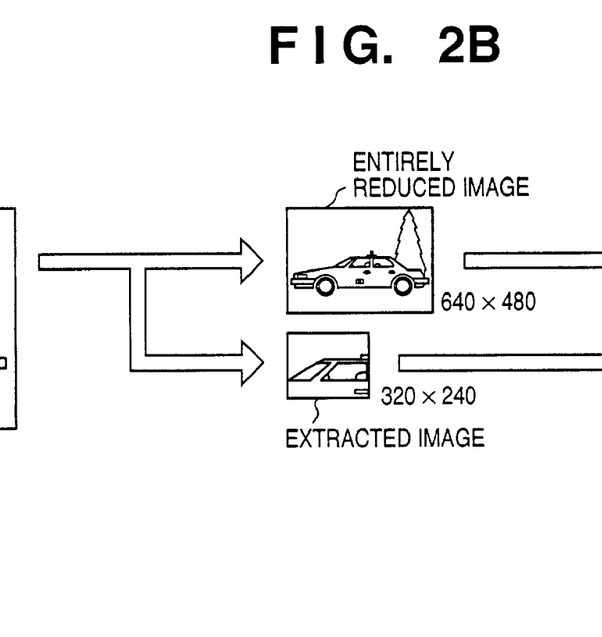
Figure 2C:
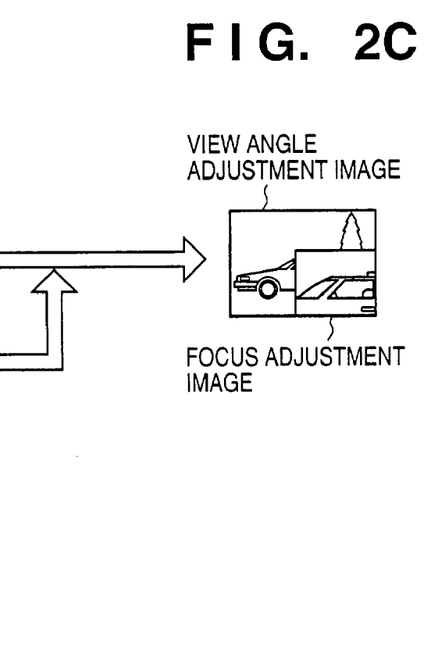

FIGS. 2A to 2C are views for explaining the relationship between a sensed image and a display image. FIGS. 2A, 2B, and 2C show examples of a sensed image. FIG. 2A illustrates a sensed image read from the image sensing element 108. FIG. 2B shows an entirely reduced image obtained by sampling and reducing, at a predetermined magnification, pixel data of the image read from the image sensing element 108, and an image extracted from the rectangular region of the sensed image in FIG. 2A without sampling pixel data of this region. FIG. 2C shows a view angle adjustment image and focus adjustment image which are obtained by synthesizing the entirely reduced image and extracted image in FIG. 2B, and displayed on the liquid crystal monitor 121 serving as a display device.

Display operation of the image sensing apparatus according to the first embodiment will be explained.

The image sensing lens 106 can be moved by the focus driving unit 107 along the optical axis. The stop 123 inserted in the optical axis is driven by the stop driving unit 124. The image sensing element 108 is inserted in the optical axis of the image sensing lens 106. An object image having passed through the image sensing lens 106 is formed on the image sensing surface of the image sensing element 108. The image sensing lens 106 is larger in the number of pixels than the monitor 121.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by the A/D converter 109. The digital image signal is input to the signal processing circuit 110. The signal processing circuit 110 includes a white balance adjustment circuit, gamma correction circuit, YC processing circuit, and exposure/focus (AE/AF) circuit. The signal processing circuit 110 outputs image data processed by these circuits to the reduction circuit 111 and extraction circuit 117. AE data serving as exposure information is obtained by an AE data creation device from a brightness signal component extracted by an internal brightness signal component extraction circuit. The obtained AE data is supplied to the CPU 100. The extracted brightness signal component is supplied to an AF data creation device which is comprised of a high-pass filter and integrator. Only a high-frequency component is extracted using the high-pass filter, and integrated using the integrator, obtaining AF data serving as focus information. The obtained AF data is supplied to the CPU 100.

The reduction circuit 111 reduces the image data in horizontal and vertical directions by performing sampling, linear interpolation, and the like for pixel data of the sensed image in accordance with the display size of the monitor 121, and outputs the entirely reduced image data to the memory control circuit 115. The memory control circuit 115 sequentially writes, at a pointer Pa in the DRAM 104 shown in FIG. 5A, the image data of the display size input from the reduction circuit 111, thereby transferring the entirely reduced image data to an entirely reduced image data memory area.

Figure 3:
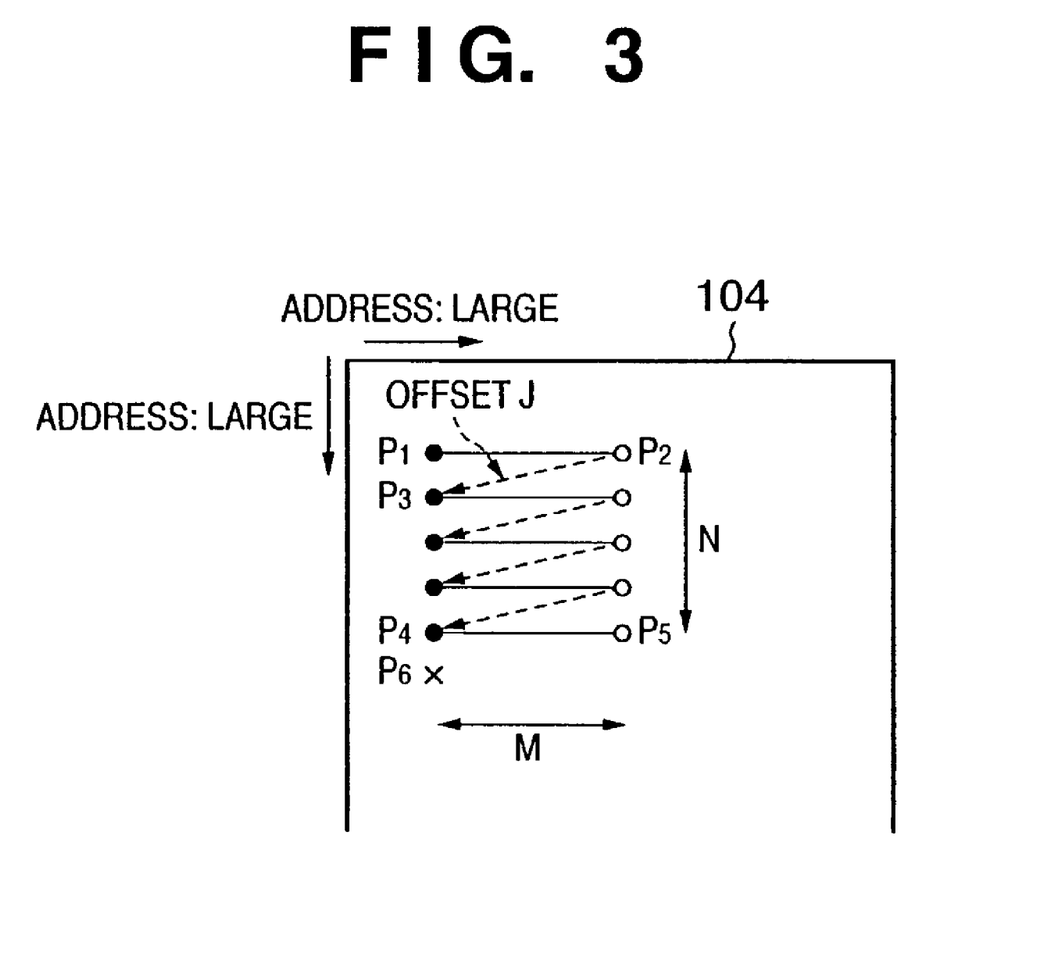
FIG. 3 is a conceptual view showing two-dimensional data transfer in the image sensing apparatus according to the first embodiment of the present invention.

FIG. 3 is a conceptual view showing the operation of the memory control circuit 115. When the DRAM 104 is assumed to be a two-dimensional plane, the memory control circuit 115 transfers data to a rectangular region in the DRAM 104.

In FIG. 3, P1, P2, P3, P4, P5, and P6 represent addresses; N, the number of lines of a rectangular region to which data is transferred; and M, the number of pixels (words) of one line. The values of distances J represented by dotted lines are the same and are equal to, e.g., the distance between P3 and P2. Transfer to the rectangular region can be realized by repeating N times transfer of M words starting from a pointer at the left end in FIG. 3.

Figure 4:
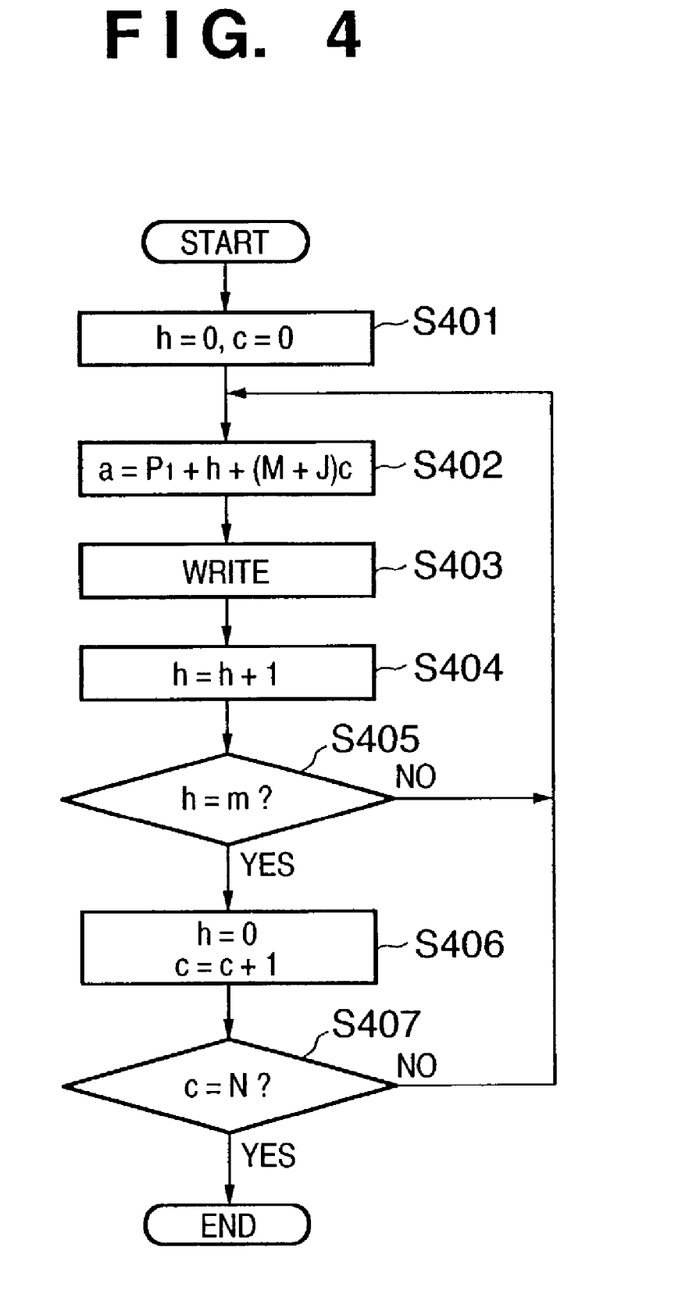
FIG. 4 is a flow chart showing the operation flow of two-dimensional data transfer in the image sensing apparatus according to the first embodiment of the present invention.

FIG. 4 is a flow chart showing the operation flow of two-dimensional data transfer. In FIG. 4, P1, M, N, and J correspond to P1, M, N, and J in FIG. 3, and are set in the setting register of the memory control circuit 115.

In FIG. 4, counter values h and c are reset in step S401. In step S402, address a is obtained from the counter values h and c (a=P1+h+(M+J)c). In step S403, data is written at address a obtained in step S402. The counter value h is incremented by one (h=h+1) in step S404, and whether the counter value h is equal to the number M of pixels (words) of one line (h=M) is decided in step S405. If YES in step S405, i.e., one line has been processed, the processing advances to step S406 to reset the counter value h (h=0) and increment the counter value c by one (c=c+1). In step S407, the number of lines is compared to decide whether the number of lines is equal to the number N of lines of the rectangular region to which data is transferred (c=N). If YES in step S407, i.e., data for all lines have been transferred, the processing operation ends.

If NO in step S405 or S407, the processing returns to step S402 to perform transfer for the next line.

This processing realizes two-dimensional data transfer.

The CPU 100 reads out, from the signal processing circuit 110, brightness information in a region from which a predetermined partial image is to be extracted. The CPU 100 controls the accumulation time (electronic shutter) of the image sensing element 108 and the f-number of the stop 123 so as to give appropriate brightness to the predetermined partial image. Accordingly, the predetermined partial image attains appropriate brightness.

The extraction circuit 117 extracts the predetermined partial image without sampling pixel data from image signals of one frame (without decreasing the number of pixels), and outputs an image signal representing the extracted partial image to the memory control circuit 115. The memory control circuit 115 sequentially writes image data of the partial image input from the extraction circuit 117 at a pointer Pb in the DRAM 104 shown in FIG. 5A, thereby transferring the extracted partial image data to an extracted partial image memory area.

The memory control circuit 115 reads out the entirely reduced image data and extracted partial image data in the DRAM 104 in accordance with the display position. The memory control circuit 115 synthesizes the entirely reduced image data and extracted partial image, and outputs the resultant data as synthesized image data to the reconstruction circuit 120.

Figure 5A:
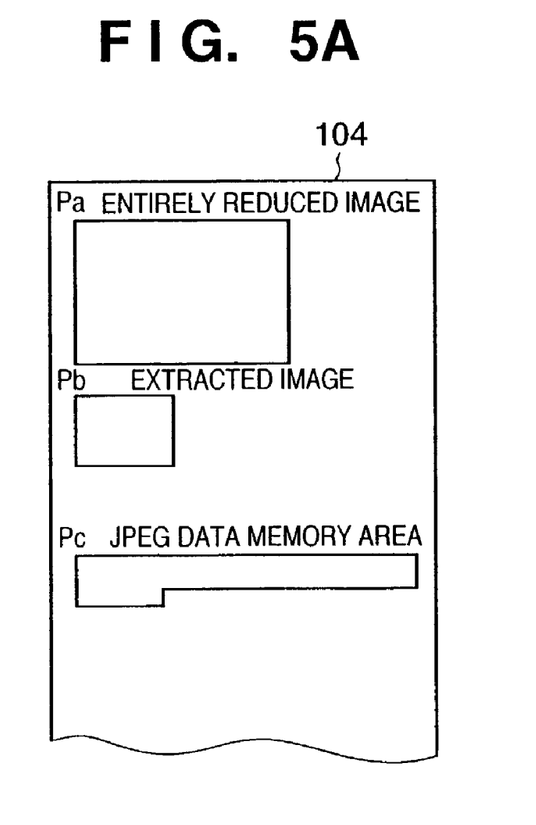
FIGS. 5A and 5B are views showing an example of system operation in the image sensing apparatus according to the first embodiment of the present invention.
Figure 5B:
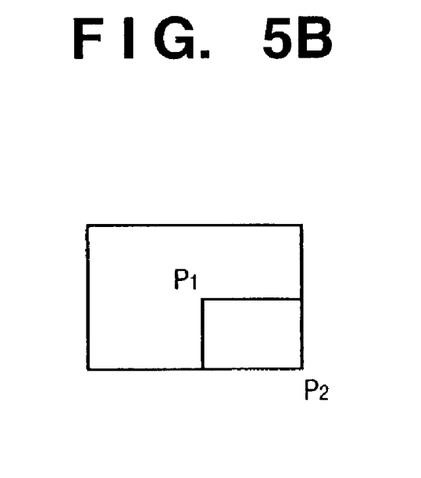

FIGS. 5A and 5B are conceptual views showing data transfer operation of the memory control circuit 115 to the reconstruction circuit 120. In FIG. 5A, Pa, Pb, and Pc represent pointers in the DRAM 104. In FIG. 5B, P1 and P2 represent pointers. When data falls outside the range of numerical values represented by the pointers P1 and P2, the address of an entirely reduced image in FIG. 5A is generated. When data falls within the range of the numerical values represented by the pointers P1 and P2, the image is switched to an extracted image in FIG. 5A to generate an address, and synthesized image data is output.

The reconstruction circuit 120 executes signal processing such as chroma encoding, band correction, or compositeness for the synthesized image data input from the memory control circuit 115, thereby converting the data into a TV (TeleVision) analog signal. The reconstruction circuit 120 outputs the video signal to the monitor 121.

As described above, according to the image sensing method and apparatus of the first embodiment, the in-focus state of an image sensed by the image sensing element 108 having a large number of pixels can be properly confirmed with appropriate brightness on the monitor 121 having a small number of pixels. The user can manually adjust the focus at a high precision while confirming an entire frame and focus adjustment frame free from any timing difference.

Second Embodiment

The second embodiment will be described with reference to FIGS. 1 and 7A to 7C.

The basic system configuration of an image sensing apparatus according to the second embodiment is the same as that in FIG. 1 according to the first embodiment described above. Display in the MF mode is illustrated in FIGS. 2A to 2C, similar to the first embodiment. An example of system operation is shown in FIGS. 5A and 5B, similar to the first embodiment. The second embodiment will be explained with reference to these drawings.

The second embodiment is applied to an electronic camera having an autofocus (to be referred to as AF hereinafter) function of automatically adjusting the focus on an image, and a manual focus (to be referred to as MF hereinafter) function of adjusting the focus manually (including electrically).

Figure 7A:
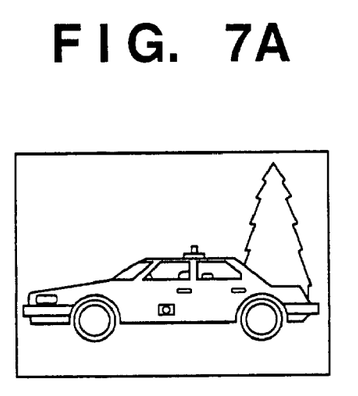
FIGS. 7A to 7C are views for explaining display operation in an AF mode in an image sensing apparatus according to the second embodiment of the present invention.
Figure 7B:
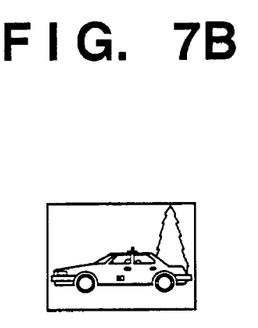
Figure 7C:
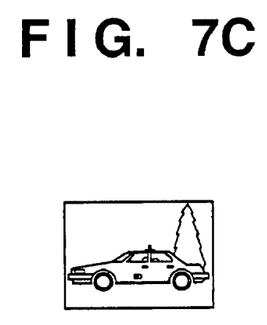

FIGS. 7A to 7C are views for explaining the relationship between a sensed image and a display image. FIGS. 7A, 7B, and 7C show examples of a sensed image. FIG. 7A illustrates an image read from an image sensing element 108. FIG. 7B shows a reduced image obtained by zooming, at a predetermined magnification, the image read from the image sensing element 108. FIG. 7C shows the reduced image in FIG. 7B displayed on a monitor 121 serving as a display device.

Display operation of the image sensing apparatus according to the second embodiment will be explained.

The second embodiment is different from the first embodiment in that a signal processing circuit 110 comprises an exposure/focus (AE/AF) circuit. The signal processing circuit 110 includes a white balance adjustment circuit, gamma correction circuit, and YC circuit. Image data processed by these circuits are output to a reduction circuit 111 and extraction circuit 117. AE data serving as exposure information is obtained by an AE data creation device from a brightness signal component extracted by an internal brightness signal component extraction circuit. The obtained AE data is supplied to a CPU 100. The extracted brightness signal component is supplied to an AF data creation device which is comprised of a high-pass filter and integrator. Only a high-frequency component is extracted using the high-pass filter, and integrated using the integrator, obtaining AF data serving as focus information. The obtained AF data is supplied to the CPU 100.

Display operation of the image sensing apparatus according to the second embodiment will be described in detail.

More specifically, image data of 1,600 horizontal pixels and 1,200 vertical pixels at the aspect ratio of the image size=4:3 is reduced to 640×480 by the reduction circuit 111. In the MF mode, a 320×240 partial image is extracted by the extraction circuit 117. The 640×480 image data reduced by the reduction circuit 111 and the 320×240 partial image extracted by the extraction circuit 117 are displayed on the monitor 121. This example will be explained.

An image sensing lens 106 can be moved by a focus driving unit 107 along the optical axis. A stop 123 inserted in the optical axis is driven by a stop driving unit 124. The image sensing element 108 is inserted in the optical axis of the image sensing lens 106. An object image having passed through the image sensing lens 106 is formed on the image sensing surface of the image sensing element 108. The image sensing element 108 outputs image data of 1,600 horizontal pixels and 1,200 vertical pixels. The monitor 121 displays image data of 640 horizontal pixels and 480 vertical pixels.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by an A/D converter 109. The digital image signal is input to the signal processing circuit 110. The signal processing circuit 110 includes the white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies AE data and AF data at the entire view angle to the CPU 100.

The CPU 100 calculates stop control information and an accumulation time on the basis of the AE data, and supplies the accumulation time (electronic shutter) information to the driving unit of the image sensing element 108 and the stop control information to the driving circuit 124 of the stop 123. When the AF mode is set (the setting of the AF mode corresponds to an initial state in which the MF mode is not set by a switch $S_{MF}$ out of switches 122), the CPU 100 can generate focus control information on the basis of the AF data obtained along with the operation of a focus mechanism, drive the focus driving unit 107, and automatically set the image sensing lens 106 to an in-focus position.

The reduction circuit 111 reduces pixel data in horizontal and vertical directions by performing sampling, linear interpolation, and the like for pixel data in accordance with the display size of the monitor 121 (see FIG. 7B), and outputs the entirely reduced image data to a memory control circuit 115. The memory control circuit 115 sequentially writes, at a pointer Pa in a DRAM 104 shown in FIG. 5A, the image data of the display size input from the reduction circuit (zooming circuit) 111, thereby transferring the entirely reduced image data to an entirely reduced image data memory area.

The memory control circuit 115 reads out the entirely reduced image data in the DRAM 104 in accordance with the display position, and outputs the entirely reduced image data to a reconstruction circuit 120.

The reconstruction circuit 120 executes signal processing such as chroma encoding, band correction, or compositeness for the entirely reduced image data input from the memory control circuit 115, thereby converting the data into a TV (TeleVision) analog signal. The reconstruction circuit 120 outputs the video signal to the monitor 121 (see FIG. 7C).

When the AF mode is switched to the MF mode (the setting of the MF mode corresponds to a state in which the MF mode is set by the switch $S_{MF}$ out of the switches 122), the CPU 100 stops auto focus control based on the AF data, switches the mode to the manual focus mode, and enables switches $S_{F1}$ and $S_{F2}$.

The switch $S_{F1}$ is used to designate to drive the focus driving unit 107 and drive the image sensing lens 106 to infinity. The switch $S_{F2}$ is used to designate to drive the focus driving unit 107 and drive the image sensing lens 106 to the closest focusing side.

An object image (see FIG. 2A) formed on the image sensing surface of the image sensing element 108 is photoelectrically converted by the image sensing element 108, and sequentially read as CCD signals. Each CCD signal is converted from an analog signal into a digital signal by the A/D converter 109. The digital image signal is input to the signal processing circuit 110. The signal processing circuit 110 includes the white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies, to the CPU 100, AE data and AF data of partial image data extracted by the extraction circuit 117.

The CPU 100 calculates stop control information and an accumulation time on the basis of the AE data, and supplies the accumulation time (electronic shutter) information to the driving unit of the image sensing element 108 and the stop control information to the driving circuit 124 of the stop 123.

Hence, the partial image data extracted by the extraction circuit 117 attains appropriate brightness.

The extraction circuit 117 generates an address, and outputs image data at a portion within the range of numerical values represented by pointers P1 and P2 shown in FIG. 2A from image signals of 1,600 horizontal pixels and 1,200 vertical pixels of one frame that are input from the signal processing circuit 110. When data falls outside the range of the numerical values represented by the pointer P1 (640 horizontal pixels and 480 vertical pixels) and the pointer P2 (960 horizontal pixels and 720 vertical pixels) shown in FIG. 2A, the extraction circuit 117 does not output any image data. The extraction circuit 117 extracts a partial image of 320 horizontal pixels and 240 vertical pixels without sampling (without decreasing the number of pixels), and outputs an image signal representing the extracted partial image to the memory control circuit 115. The memory control circuit 115 sequentially writes image data of the 320×240 partial image input from the extraction circuit 117 at a pointer Pb in the DRAM 104 shown in FIG. 5A, thereby transferring the extracted partial image data to an extracted partial image memory area.

The memory control circuit 115 reads out the 640×480 entirely reduced image data and the 320×240 extracted partial image data in the DRAM 104 in accordance with the display position. The memory control circuit 115 synthesizes the entirely reduced image data and extracted partial image, and outputs the resultant data as synthesized image data to the reconstruction circuit 120.

When the focus mode is switched from the AF mode to the MF mode by operating the switch $S_{MF}$ in photographing, the monitor 121 changes from a state in which a sensed image is displayed as shown in FIG. 7C, and displays the entirely reduced image data and the predetermined appropriate-brightness partial image extracted using a predetermined position of the image as a center, as shown in FIG. 2C. While monitoring the focus adjustment image in FIG. 2C, the user can operate the switches $S_{F1}$ and $S_{F2}$, move the image sensing lens 106 forward or backward, and focus it on an object to be sensed.

The focus adjustment image is an appropriate-brightness image which is extracted using a predetermined position of an image sensing signal as a center without decreasing the number of pixels. The user can, therefore, confirm the same state as the focus state of a recorded image.

The view angle adjustment image in FIG. 2C is simultaneously displayed on the monitor 121. Even if the user changes an object to be sensed, he/she can focus the image sensing lens 106 on the object while confirming the entire view angle.

When the MF mode is switched to the AF mode (the switch $S_{MF}$ out of the switches 122 is released), the CPU 100 inhibits the extraction circuit 117 and control of the memory control circuit 115 from the extraction circuit 117. The memory control circuit 115 reads out entirely reduced image data in the DRAM 104, and outputs it to the reconstruction circuit 120, setting the states in FIGS. 7A to 7C. After that, the CPU 100 is set in the AF mode.

Figure 8A:
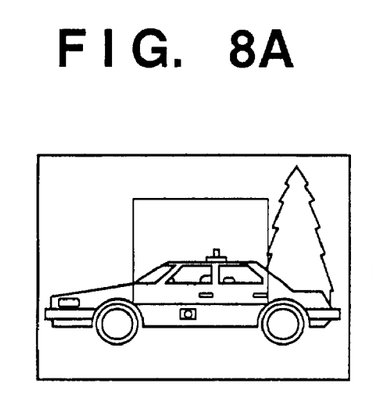
FIGS. 8A to 8C is a view for explaining display operation in an MF mode in the image sensing apparatus according to the second embodiment of the present invention.
Figure 8B:
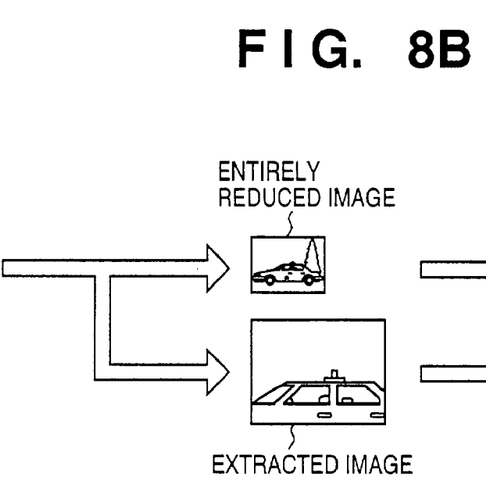
Figure 8C:
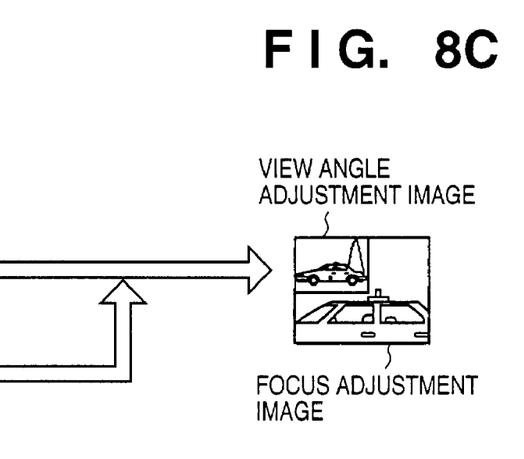

In the second embodiment, entirely reduced image data corresponds to 640×480 pixels, and an extracted image corresponds to 320×240 pixels. Alternatively, as shown in FIGS. 8A to 8C, entirely reduced image data may correspond to 320×240 pixels, and an extracted image may correspond to 640×480 pixels.

Also, images in FIGS. 8A to 8C and 2A to 2C may be switched.

The remaining arrangement, operation, and effects of the second embodiment are the same as those of the first embodiment, and a description thereof will be omitted.

Third Embodiment

The third embodiment of the present invention will be described with reference to FIG. 6.

The basic system configuration of an image sensing apparatus according to the third embodiment is the same as that in FIG. 1 according to the first embodiment described above. Display in the MF mode is illustrated in FIGS. 2A to 2C, similar to the first embodiment. In FIG. 6, the same reference numerals as in FIG. 1 according to the first embodiment denote the same parts. An example of system operation is shown in FIGS. 5A and 5B, similar to the first embodiment. The third embodiment will be explained with reference to these drawings.

The third embodiment is applied to an electronic camera having an autofocus (to be referred to as AF hereinafter) function of automatically adjusting the focus on an image, and a manual focus (to be referred to as MF hereinafter) function of adjusting the focus manually (including electrically).

Figure 6:
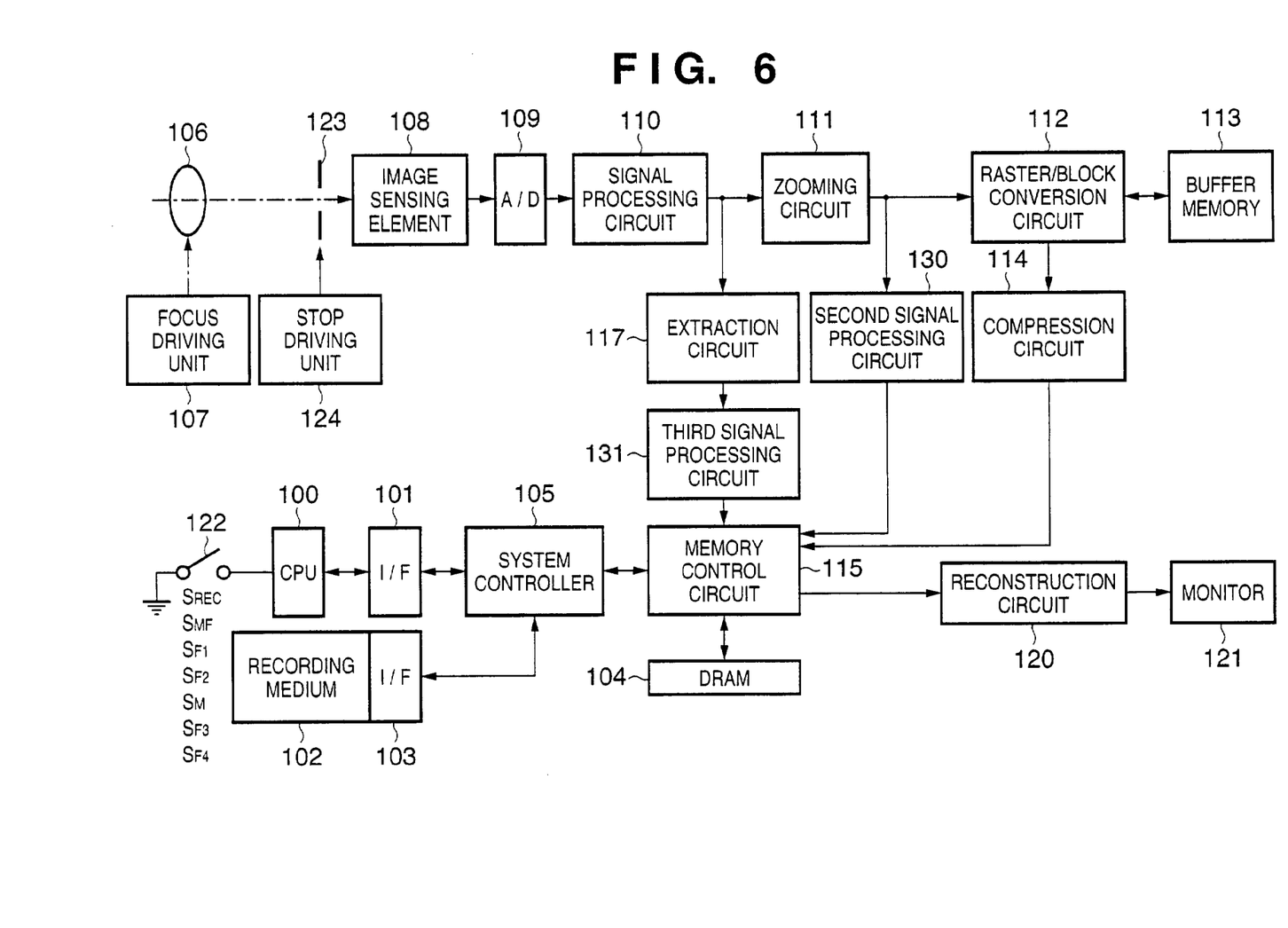
FIG. 6 is a block diagram showing the system configuration of an image sensing apparatus according to the third embodiment of the present invention.

FIG. 6 is different from FIG. 1 in that a second signal processing circuit 130 which performs predetermined gain signal processing for the brightness signal component of an image signal reduced by a reduction circuit 111 is interposed between the reduction circuit 111 and a memory control circuit 115, and a third signal processing circuit 131 which performs predetermined gain signal processing for the brightness signal component of an image signal extracted by an extraction circuit 117 is interposed between the extraction circuit 117 and the memory control circuit 115. In FIG. 6, the same reference numerals as in FIG. 1 according to the first embodiment denote the same parts.

FIGS. 7A to 7C are views for explaining the relationship between a sensed image and a display image. FIGS. 7A, 7B, and 7C show examples of a sensed image. FIG. 7A illustrates an image read from an image sensing element 108. FIG. 7B shows a reduced image obtained by zooming, at a predetermined magnification, the image read from the image sensing element 108. FIG. 7C shows the reduced image in FIG. 7B displayed on a monitor 121 serving as a display device.

Display operation of the image sensing apparatus according to the third embodiment will be explained.

More specifically, image data of 1,600 horizontal pixels and 1,200 vertical pixels at the aspect ratio of the image size=4:3 is reduced to 640×480 by the reduction circuit 111. In the MF mode, a 320×240 partial image is extracted by the extraction circuit 117. The 640×480 image data reduced by the reduction circuit 111 and the 320×240 partial image extracted by the extraction circuit 117 are displayed on the monitor 121. This example will be explained.

An image sensing lens 106 can be moved by a focus driving unit 107 along the optical axis. A stop 123 inserted in the optical axis is driven by a stop driving unit 124. The image sensing element 108 is inserted in the optical axis of the image sensing lens 106. An object image having passed through the image sensing lens 106 is formed on the image sensing surface of the image sensing element 108. The image sensing element 108 outputs image data of 1,600 horizontal pixels and 1,200 vertical pixels. The monitor 121 displays image data of 640 horizontal pixels and 480 vertical pixels.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by an A/D converter 109. The digital image signal is input to a signal processing circuit 110. The signal processing circuit 110 includes a white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies AE data and AF data at the entire view angle to a CPU 100.

The CPU 100 calculates stop control information and an accumulation time on the basis of the AE data at the entire view angle, and supplies the accumulation time (electronic shutter) information to the driving unit of the image sensing element 108 and the stop control information to the driving circuit 124 of the stop 123. When the AF mode is set (the setting of the AF mode corresponds to an initial state in which the MF mode is not set by a switch $S_{MF}$ out of switches 122), the CPU 100 can generate focus control information on the basis of the AF data obtained along with the operation of a focus mechanism, drive the focus driving unit 107, and automatically set the image sensing lens 106 to an in-focus position.

The reduction circuit 111 reduces pixel data in horizontal and vertical directions by performing sampling, linear interpolation, and the like for pixel data in accordance with the display size of the monitor 121 (see FIG. 7B), and outputs the entirely reduced image data to the second signal processing circuit 130. The second signal processing circuit 130 outputs, to the memory control circuit 115 without any processing, the image data which is input from the reduction circuit 111 and has a display size of 640×480. The memory control circuit 115 sequentially writes, at a pointer Pa in a DRAM 104 shown in FIG. 5A, the image data of the display size input from the second signal processing circuit 130, thereby transferring the entirely reduced image data to an entirely reduced image data memory area. The memory control circuit 115 reads out the entirely reduced image data in the DRAM 104 in accordance with the display position, and outputs the entirely reduced image data to a reconstruction circuit 120.

The reconstruction circuit 120 executes signal processing such as chroma encoding, band correction, or compositeness for the entirely reduced image data input from the memory control circuit 115, thereby converting the data into a TV (TeleVision) analog signal. The reconstruction circuit 120 outputs the video signal to the monitor 121 (see FIG. 7C).

When the AF mode is switched to the MF mode (the setting of the MF mode corresponds to a state in which the MF mode is set by the switch $S_{MF}$ out of the switches 122), the CPU 100 stops auto focus control based on the AF data, switches the mode to the manual focus mode, and enables switches $S_{F1}$ and $S_{F2}$.

The switch $S_{F1}$ is used to designate to drive the focus driving unit 107 and drive the image sensing lens 106 to infinity. The switch $S_{F2}$ is used to designate to drive the focus driving unit 107 and drive the image sensing lens 106 to the closest focusing side.

An object image (see FIG. 2A) formed on the image sensing surface of the image sensing element 108 is photoelectrically converted by the image sensing element 108, and sequentially read as CCD signals. Each CCD signal is converted from an analog signal into a digital signal by the A/D converter 109. The digital image signal is input to the signal processing circuit 110. The signal processing circuit 110 includes the white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies, to the CPU 100, AE data at the entire view angle, and AE data and AF data of partial image data extracted by the extraction circuit 117.

The CPU 100 calculates stop control information and an accumulation time on the basis of the AE data of the partial image data, and supplies the accumulation time (electronic shutter) information to the driving unit of the image sensing element 108 and the stop control information to the driving circuit 124 of the stop 123. The CPU 100 also calculates a brightness correction value on the basis of an exposure correction amount by the AE data of the partial image data and the AE data at the entire view angle, and supplies the brightness correction value to the second signal processing circuit 130.

As a result, the exposure amount of the partial image data extracted by the extraction circuit 117 is controlled to obtain appropriate brightness.

The second signal processing circuit 130 performs, e.g., gain processing of multiplying, by the brightness correction value input from the CPU 100, the entirely reduced image data which is input from the reduction circuit 111 and has a display size of 640×480. The second signal processing circuit 130 outputs the resultant data to the memory control circuit 115.

Hence, the entirely reduced image data output from the reduction circuit 111 undergoes brightness correction to attain appropriate brightness.

The extraction circuit 117 generates an address, and outputs image data at a portion within the range of numerical values represented by pointers P1 and P2 shown in FIG. 2A from image signals of 1,600 horizontal pixels and 1,200 vertical pixels of one frame that are input from the signal processing circuit 110. When data falls outside the range of the numerical values represented by the pointer P1 (640 horizontal pixels and 480 vertical pixels) and the pointer P2 (960 horizontal pixels and 720 vertical pixels) shown in FIG. 2A, the extraction circuit 117 does not output any image data. The extraction circuit 117 extracts a partial image of 320 horizontal pixels and 240 vertical pixels without sampling (without decreasing the number of pixels), and outputs an image signal representing the extracted partial image to the third signal processing circuit 131.

The third signal processing circuit 131 outputs image data of the 320×240 partial image input from the extraction circuit 117 to the memory control circuit 115 without any processing. The memory control circuit 115 sequentially writes the image data of the 320×240 partial image input from the third signal processing circuit 131 at a pointer Pb in the DRAM 104 shown in FIG. 5A, thereby transferring the extracted partial image data to an extracted partial image memory area.

The memory control circuit 115 reads out the 640×480 entirely reduced image data and the 320×240 extracted partial image data in the DRAM 104 in accordance with the display position. The memory control circuit 115 synthesizes the entirely reduced image data and extracted partial image, and outputs the resultant data as synthesized image data to the reconstruction circuit 120.

When the focus mode is switched from the AF mode to the MF mode by operating the switch $S_{MF}$ in photographing, the monitor 121 changes from a state in which a sensed image is displayed as shown in FIG. 7C, and displays at appropriate brightness the entirely reduced image data and the partial image extracted using a predetermined position of the image as a center, as shown in FIG. 2C. While monitoring the focus adjustment image in FIG. 2C, the user can operate the switches $S_{F1}$ and $S_{F2}$, move the image sensing lens 106 forward or backward, and focus it on an object to be sensed.

The focus adjustment image is an appropriate-brightness image which is extracted using a predetermined position of an image sensing signal as a center without decreasing the number of pixels. The user can, therefore, confirm the same state as the focus state of a recorded image.

The view angle adjustment image in FIG. 2C is simultaneously displayed as an appropriate-brightness image on the monitor 121. Even if the user changes an object to be sensed, he/she can focus the image sensing lens 106 on the object while confirming the entire view angle.

When the MF mode is switched to the AF mode (the switch $S_{MF}$ out of the switches 122 is released), the CPU 100 inhibits the extraction circuit 117 and control of the memory control circuit 115 from the extraction circuit 117. The extraction circuit 117 reads out entirely reduced image data in the DRAM 104, and outputs it to the reconstruction circuit 120, setting the states in FIGS. 7A to 7C. After that, the CPU 100 is set in the AF mode.

In the third embodiment, entirely reduced image data corresponds to 640×480 pixels, and an extracted image corresponds to 320×240 pixels. Alternatively, as shown in FIGS. 8A to 8C, entirely reduced image data may correspond to 320×240 pixels, and an extracted image may correspond to 640×480 pixels.

Also, images in FIGS. 8A to 8C and 2A to 2C may be switched.

The remaining arrangement, operation, and effects of the third embodiment are the same as those of the first embodiment, and a description thereof will be omitted.

Fourth Embodiment

The fourth embodiment of the present invention will be described with reference to FIG. 6.

The basic system configuration of an image sensing apparatus according to the fourth embodiment is the same as that in FIG. 6 according to the third embodiment described above. Display in the MF mode is illustrated in FIGS. 2A to 2C, similar to the first embodiment described above. An example of system operation is shown in FIGS. 5A and 5B, similar to the first embodiment. The fourth embodiment will be explained with reference to these drawings.

The fourth embodiment is applied to an electronic camera having an autofocus (to be referred to as AF hereinafter) function of automatically adjusting the focus on an image, and a manual focus (to be referred to as MF hereinafter) function of adjusting the focus manually (including electrically).

Display operation of the image sensing apparatus according to the fourth embodiment will be explained.

More specifically, image data of 1,600 horizontal pixels and 1,200 vertical pixels at the aspect ratio of the image size=4:3 is reduced to 640×480 by a reduction circuit (zooming circuit) 111. In the MF mode, a 320×240 partial image is extracted by an extraction circuit 117. The 640×480 image data reduced by the reduction circuit 111 and the 320×240 partial image extracted by the extraction circuit 117 are displayed on a monitor 121. This example will be explained.

An image sensing lens 106 can be moved by a focus driving unit 107 along the optical axis. A stop 123 inserted in the optical axis is driven by a stop driving unit 124. An image sensing element 108 is inserted in the optical axis of the image sensing lens 106. An object image having passed through the image sensing lens 106 is formed on the image sensing surface of the image sensing element 108. The image sensing element 108 outputs image data of 1,600 horizontal pixels and 1,200 vertical pixels. The monitor 121 displays image data of 640 horizontal pixels and 480 vertical pixels.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by an A/D converter 109. The digital image signal is input to a signal processing circuit 110. The signal processing circuit 110 includes a white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies, to a CPU 100, AE data at the entire view angle, and AE data and AF data of partial image data extracted by the extraction circuit 117.

The CPU 100 executes following processing in the case that the image sensing apparatus is set to a moving image mode where image data are continuously recorded on the basis of a signal which permits an image sensing operation. More specifically, the CPU 100 calculates stop control information and an accumulation time on the basis of the AE data at the entire view angle, and supplies the accumulation time (electronic shutter) information to the driving unit of the image sensing element 108 and the stop control information to the driving circuit 124 of the stop 123. The CPU 100 calculates a brightness correction value on the basis of an exposure correction amount by the AE data at the entire view angle and the AE data of the partial image data, and supplies the brightness correction value to a third signal processing circuit 131.

As a result, the image data at the entire view angle which is controlled in exposure amount and output from the signal processing circuit 110 attains appropriate brightness.

The reduction circuit 111 performs sampling or the like for pixel data in accordance with 640 horizontal pixels and 480 vertical pixels as the display size of the monitor 121, and outputs, to a second signal processing circuit 130, image data which is entirely reduced to ⅖ (640×480) in horizontal and vertical directions. The second signal processing circuit 130 outputs, to a memory control circuit 115 without any processing, the image data which is input from the reduction circuit 111 and has a display size of 640×480. The memory control circuit 115 sequentially writes, at a pointer Pa in a DRAM 104 shown in FIG. 5A, the image data which is input from the second signal processing circuit 130 and has a display size of 640×480, thereby transferring the entirely reduced image data to an entirely reduced image data memory area.

The extraction circuit 117 generates an address, and outputs image data at a portion within the range of numerical values represented by pointers P1 and P2 shown in FIG. 2A from image signals of 1,600 horizontal pixels and 1,200 vertical pixels of one frame that are input from the signal processing circuit 110. When data falls outside the range of the numerical values represented by the pointer P1 (640 horizontal pixels and 480 vertical pixels) and the pointer P2 (960 horizontal pixels and 720 vertical pixels), the extraction circuit 117 does not output any image data. The extraction circuit 117 extracts a partial image of 320 horizontal pixels and 240 vertical pixels without decreasing the number of pixels, and outputs an image signal representing the extracted partial image to the third signal processing circuit 131.

The third signal processing circuit 131 performs, e.g., gain processing using the brightness correction value supplied from the CPU 100 for image data of the 320×240 partial image input from the extraction circuit 117, and outputs the resultant data to the memory control circuit 115.

Image data which is obtained by correcting the brightness of the partial image and output from the third signal processing circuit 131 attains appropriate brightness.

The memory control circuit 115 sequentially writes the image data of the 320×240 partial image input from the third signal processing circuit 131 at a pointer Pb in the DRAM 104 shown in FIG. 5A, thereby transferring the extracted partial image data to an extracted partial image memory area.

The memory control circuit 115 reads out the 640×480 entirely reduced image data and the 320×240 extracted partial image data in the DRAM 104 in accordance with the display position. The memory control circuit 115 synthesizes the entirely reduced image data and extracted partial image, and outputs the resultant data as synthesized image data to a reconstruction circuit 120.

The switch $S_{REC}$ is used to designate recording of a sensed image. When the switch $S_{REC}$ is turned on, the CPU 100 newly ensures a JPEG data memory area at a pointer Pc in DRAM 104 shown in FIG. 5A. Data sensed by the image sensing element 108 is converted into a digital signal by the A/D converter 109. The digital image signal is output as 1,600×1,200 image data to the signal processing circuit 110, reduction circuit 111, and extraction circuit 117. The reduction circuit 111 reduces pixel data to ⅖ the pixel data amount in horizontal and vertical directions by sampling. The reduction circuit 111 outputs the 640×480 entirely reduced image data to the second signal processing circuit 130.

The second signal processing circuit 130 outputs the 640×480 entirely reduced image data from the reduction circuit 111 to the memory control circuit 115 and a raster/block conversion circuit 112 without any processing. The raster/block conversion circuit 112 converts raster data from a raster block conversion buffer memory 113 into block scan data, and outputs the block scan data to a compression circuit 114. The compression circuit 114 compresses data of each block into JPEG data, and outputs the JPEG data to the memory control circuit 115. The memory control circuit 115 sequentially writes, at the pointer Pc in the DRAM 104 shown in FIG. 5A, the JPEG data input from the compression circuit 114, thereby transferring the JPEG data to the JPEG data memory area. The CPU 100 reads out the JPEG data from the pointer PC in the DRAM 104 shown in FIG. 5A, and writes the data as a JPEG file in a storage medium 102.

Similarly, the extraction circuit 117 extracts a 320×240 partial image from the 1,600×1,200 image data input from the signal processing circuit 110, and outputs the extracted partial image to the third signal processing circuit 131.

The third signal processing circuit 131 performs brightness correction for brightness information of image data of the 320×240 partial image input from the extraction circuit 117, gives appropriate brightness to the image data of the 320×240 partial image, and outputs the image data to the memory control circuit 115. The memory control circuit 115 transfers the image data of the partial image to the pointer Pb in the DRAM 104 shown in FIG. 5A. The memory control circuit 115 reads out the 640×480 entirely reduced image data in the DRAM 104 and the 320×240 partial image extracted by the extraction circuit 117 in accordance with the display position. The memory control circuit 115 synthesizes the entirely reduced image data and the partial image extracted by the extraction circuit 117, and outputs the resultant data as synthesized image data to the reconstruction circuit 120.

The CPU 100 executes following processing in the case that the image sensing apparatus is set to a moving image mode where image data are continuously recorded on the basis of a signal which permits an image sensing operation. More specifically, the CPU controls the image sensing apparatus such that the exposure amount is controlled and image data of all image angle outputted from the signal processing circuit 110 become to have appropriate brightness as the present embodiment, in the case that the moving image mode has been selected.

Further, the CPU 100 executes following processing in the case that the image sensing apparatus is set to a still image mode where still image data is recorded on the basis of a signal which permits an image sensing operation. More specifically, the CPU controls the image sensing apparatus such that the exposure amount of the partial image data extracted by the extraction circuit 117 is controlled and the partial image data become to have appropriate brightness as the third embodiment.

The remaining arrangement, operation, and effects of the fourth embodiment are the same as those of the first embodiment, and a description thereof will be omitted.

Fifth Embodiment

The fifth embodiment of the present invention will be described with reference to FIG. 6.

The basic system configuration of an image sensing apparatus according to the fifth embodiment is the same as that in FIG. 6 according to the third embodiment described above. Display in the MF mode is illustrated in FIGS. 2A to 2C, similar to the first embodiment described above. An example of system operation is shown in FIGS. 5A and 5B, similar to the third embodiment. The fifth embodiment will be explained with reference to these drawings.

The fifth embodiment is applied to an electronic camera having an autofocus (to be referred to as AF hereinafter) function of automatically adjusting the focus on an image, and a manual focus (to be referred to as MF hereinafter) function of adjusting the focus manually (including electrically).

Display operation of the image sensing apparatus according to the fifth embodiment will be explained.

More specifically, image data of 1,600 horizontal pixels and 1,200 vertical pixels at the aspect ratio of the image size=4:3 is reduced to 640×480 by a reduction circuit (zooming circuit) 111. In the MF mode, a 320×240 partial image is extracted by an extraction circuit 117. The 640×480 image data reduced by the reduction circuit 111 and the 320×240 partial image extracted by the extraction circuit 117 are displayed on a monitor 121. This example will be explained.

An image sensing lens 106 can be moved by a focus driving unit 107 along the optical axis. A stop 123 inserted in the optical axis is driven by a stop driving unit 124. An image sensing element 108 is inserted in the optical axis of the image sensing lens 106. An object image having passed through the image sensing lens 106 is formed on the image sensing surface of the image sensing element 108. The image sensing element 108 outputs image data of 1,600 horizontal pixels and 1,200 vertical pixels. The monitor 121 displays image data of 640 horizontal pixels and 480 vertical pixels.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by an A/D converter 109. The digital image signal is input to a signal processing circuit 110. The signal processing circuit 110 includes a white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies, to a CPU 100, AE data at the entire view angle, and AE data and AF data of partial image data extracted by the extraction circuit 117.

The CPU 100 calculates stop control information and an exposure correction amount serving as an accumulation time (electronic shutter) on the basis of the AE data at the entire view angle. The CPU 100 calculates a brightness correction value on the basis of the exposure correction amount by the AE data at the entire view angle and the AE data of the partial image data.

The CPU 100 determines whether the brightness correction value can be corrected, and if so, supplies the accumulation time (electronic shutter) information to the driving unit of the image sensing element 108 and the stop control information to the driving circuit 124 of the stop 123. Also, the CPU 100 supplies the brightness correction value to a second signal processing circuit 130.

In this manner, the exposure amount of the partial image data extracted by the extraction circuit 117 is controlled, obtaining appropriate brightness.

If the brightness correction value cannot be corrected, the CPU 100 corrects the exposure correction amount so as to change the brightness correction value to a correctable value, and supplies the exposure correction amount to the accumulation time (electronic shutter) of the image sensing element 108 and the stop driving unit 124.

The CPU 100 executes brightness correction calculation on the basis of the exposure correction amount and the AE data at the entire view angle, and supplies the brightness correction value to the second signal processing circuit 130.

The CPU 100 calculates a brightness correction value on the basis of the exposure correction amount and the AE data of the partial image data, and supplies the brightness correction value to a third signal processing circuit 131.

Accordingly, the exposure amount of the partial image data extracted by the extraction circuit 117 is controlled, and no appropriate brightness is obtained.

The reduction circuit 111 performs sampling or the like for pixel data in accordance with 640 horizontal pixels and 480 vertical pixels as the display size of the monitor 121, and outputs, to the second signal processing circuit 130, image data which is entirely reduced to ⅖ (640×480) in horizontal and vertical directions.

The second signal processing circuit 130 performs, e.g., gain processing of multiplying, by the brightness correction value input from the CPU 100, the entirely reduced image data which is input from the reduction circuit 111 and has a display size of 640×480. The second signal processing circuit 130 outputs the resultant data to a memory control circuit 115.

The brightness of the entirely reduced image data output from the reduction circuit 111 is therefore corrected to attain appropriate brightness.

The memory control circuit 115 sequentially writes, at a pointer Pa in a DRAM 104 shown in FIG. 5A, the image data which is input from the second signal processing circuit 130 and has a display size of 640×480, thereby transferring the entirely reduced image data to an entirely reduced image data memory area.

The extraction circuit 117 generates an address, and outputs image data at a portion within the range of numerical values represented by pointers P1 and P2 shown in FIG. 2A from image signals of 1,600 horizontal pixels and 1,200 vertical pixels of one frame that are input from the signal processing circuit 110. When data falls outside the range of the numerical values represented by the pointer P1 (640 horizontal pixels and 480 vertical pixels) and the pointer P2 (960 horizontal pixels and 720 vertical pixels), the extraction circuit 117 does not output any image data. The extraction circuit 117 extracts a partial image of 320 horizontal pixels and 240 vertical pixels without decreasing the number of pixels, and outputs an image signal representing the extracted partial image to the third signal processing circuit 131.

The third signal processing circuit 131 performs, e.g., gain processing using the brightness correction value supplied from the CPU 100 for image data of the 320×240 partial image input from the extraction circuit 117, and outputs the resultant data to the memory control circuit 115.

Image data which is obtained by correcting the brightness of the partial image and output from the third signal processing circuit 131 attains appropriate brightness.

The memory control circuit 115 sequentially writes the image data of the 320×240 partial image input from the third signal processing circuit 131 at a pointer Pb in the DRAM 104 shown in FIG. 5A, thereby transferring the extracted partial image data to an extracted partial image memory area.

The memory control circuit 115 reads out the 640×480 entirely reduced image data and the 320×240 extracted partial image data in the DRAM 104 in accordance with the display position. The memory control circuit 115 synthesizes the entirely reduced image data and extracted partial image, and outputs the resultant data as synthesized image data to a reconstruction circuit 120.

The remaining arrangement, operation, and effects of the fifth embodiment are the same as those of the first embodiment, and a description thereof will be omitted.

Sixth Embodiment

The sixth embodiment of the present invention will be described with reference to FIG. 6.

The basic system configuration of an image sensing apparatus according to the sixth embodiment is the same as that in FIG. 6 according to the third embodiment described above. Display in the MF mode is illustrated in FIGS. 2A to 2C, similar to the first embodiment described above. An example of system operation is shown in FIGS. 5A and 5B, similar to the third embodiment. The sixth embodiment will be explained with reference to these drawings.

The sixth embodiment is applied to an electronic camera having an autofocus (to be referred to as AF hereinafter) function of automatically adjusting the focus on an image, and a manual focus (to be referred to as MF hereinafter) function of adjusting the focus manually (including electrically).

Display operation of the image sensing apparatus according to the sixth embodiment will be explained.

More specifically, image data of 1,600 horizontal pixels and 1,200 vertical pixels at the aspect ratio of the image size=4:3 is reduced to 640×480 by a reduction circuit (zooming circuit) 111. In the MF mode, a 320×240 partial image is extracted by an extraction circuit 117. The 640×480 image data reduced by the reduction circuit 111 and the 320×240 partial image extracted by the extraction circuit 117 are displayed on a monitor 121. This example will be explained.

An image sensing lens 106 can be moved by a focus driving unit 107 along the optical axis. A stop 123 inserted in the optical axis is driven by a stop driving unit 124. An image sensing element 108 is inserted in the optical axis of the image sensing lens 106. An object image having passed through the image sensing lens 106 is formed on the image sensing surface of the image sensing element 108. The image sensing element 108 outputs image data of 1,600 horizontal pixels and 1,200 vertical pixels. The monitor 121 displays image data of 640 horizontal pixels and 480 vertical pixels.

The object image (see FIG. 2A) formed on the image sensing surface of the image sensing element 108 is photoelectrically converted by the image sensing element 108, and sequentially read as CCD signals. Each CCD signal is converted from an analog signal into a digital signal by an A/D converter 109. The digital image signal is input to a signal processing circuit 110. The signal processing circuit 110 includes a white balance adjustment circuit, gamma correction circuit, and YC processing circuit. The signal processing circuit 110 outputs image data of 1,600 horizontal pixels and 1,200 vertical pixels processed by these circuits to the reduction circuit 111 and extraction circuit 117. The signal processing circuit 110 supplies, to a CPU 100, AE data at the entire view angle, and AE data and AF data of partial image data extracted by the extraction circuit 117.

The CPU 100 calculates stop control information and an accumulation time on the basis of the AE data of the partial image data, and supplies the accumulation time (electronic shutter) information to the driving unit of the image sensing element 108 and the stop control information to the driving circuit 124 of the stop 123. The CPU 100 calculates a brightness correction value on the basis of an exposure correction amount by the AE data of the partial image data and the AE data at the entire view angle such that the image at the entire view angle becomes lower in brightness value than the partial image. The CPU 100 supplies the brightness correction value to a second signal processing circuit 130.

As a result, the exposure amount of the partial image data extracted by the extraction circuit 117 is controlled to obtain appropriate brightness.

The second signal processing circuit 130 performs, e.g., gain processing of multiplying, by the brightness correction value input from the CPU 100, the entirely reduced image data which is input from the reduction circuit 111 and has a display size of 640×480. The second signal processing circuit 130 outputs the resultant data to a memory control circuit 115.

The brightness of the entirely reduced image data output from the reduction circuit 111 is therefore corrected to attain appropriate brightness.

The extraction circuit 117 generates an address, and outputs image data at a portion within the range of numerical values represented by pointers P1 and P2 shown in FIG. 2A from image signals of 1,600 horizontal pixels and 1,200 vertical pixels of one frame that are input from the signal processing circuit 110. When data falls outside the range of the numerical values represented by the pointer P1 (640 horizontal pixels and 480 vertical pixels) and the pointer P2 (960 horizontal pixels and 720 vertical pixels), the extraction circuit 117 does not output any image data. The extraction circuit 117 extracts a partial image of 320 horizontal pixels and 240 vertical pixels without decreasing the number of pixels, and outputs an image signal representing the extracted partial image to a third signal processing circuit 131.

The third signal processing circuit 131 outputs the image data of the 320×240 partial image from the extraction circuit 117 to the memory control circuit 115 without any processing.

The memory control circuit 115 sequentially writes the image data of the 320×240 partial image input from the third signal processing circuit 131 at a pointer Pb in a DRAM 104 shown in FIG. 5A, thereby transferring the extracted partial image data to an extracted partial image memory area.

The memory control circuit 115 reads out the 640×480 entirely reduced image data and the 320×240 extracted partial image data in the DRAM 104 in accordance with the display position. The memory control circuit 115 synthesizes the entirely reduced image data and extracted partial image, and outputs the resultant data as synthesized image data to a reconstruction circuit 120.

The remaining arrangement, operation, and effects of the sixth embodiment are the same as those of the first embodiment, and a description thereof will be omitted.

The above-described embodiments can be changed or modified within the spirit and scope of the present invention.

For example, a distance measurement device capable of separately measuring object distances corresponding to a plurality of regions including the central region within the viewfinder may be further arranged. This device may have a multipoint distance measurement autofocus function of automatically operating the focus adjustment member to adjust the focus.

The image sensing apparatus may have a macro function.

The image sensing lens system may have a function of adjusting the stop in order to confirm the focus state of an actually sensed image.

In the above-described embodiments, the electronic shutter function of the image sensing element is used. A mechanical shutter may be adopted.

In the use of the autofocus function, a sampled image and extracted image may be synthesized and displayed after focus adjustment.

A detection device which detects whether an image is in focus may be further arranged. When the detection device detects that the image is in focus, the device may output to the image display unit an instruction signal for synchronizing and displaying a sampled image and extracted image.

In this case, when the detection device detects that the image is out of focus, the device may output to the image display unit an instruction signal for canceling synthetic display of a sampled image and extracted image. At the same time, exposure may be so controlled as to set the sampled image to appropriate brightness.

In multipoint distance measurement, it is also possible to synthesize and display an extracted image and sampled image which correspond to an in-focus region out of a plurality of distance measurement regions after focus adjustment.

A detection device which detects whether the focus adjustment member has been operated may be further arranged. When the detection device detects that the focus adjustment member has been operated, the device may output to the image display unit an instruction signal for synchronizing and displaying a sampled image and extracted image.

In this case, when the detection device detects that the focus adjustment member has not been operated, the device may output to the image display unit an instruction signal for canceling synthetic display of a sampled image and extracted image. At the same time, exposure may be so controlled as to set the sampled image to appropriate brightness.

When the detection device detects that the focus adjustment member has not been operated, the device may output, to the image display unit after the lapse of a predetermined time, an instruction signal for canceling synthetic display of a sampled image and extracted image. At the same time, exposure may be so controlled as to set the sampled image to appropriate brightness.

A macro switch which switches the image sensing apparatus to macro photographing may be further arranged to synthesize and display a sampled image and extracted image at the end of macro photographing.

In this case, when macro photographing is canceled, the macro switch may output to the image display unit an instruction signal for canceling synthetic display of a sampled image and extracted image. At the same time, exposure may be so controlled as to set the sampled image to appropriate brightness.

A stop-down switching device which switches the image sensing apparatus to a stop-down mode may be further arranged. When the image sensing apparatus is switched to the stop-down mode, the stop-down switching device may output to the image display unit an instruction signal for canceling synthetic display of a sampled image and extracted image.

When the stop-down mode is canceled, the stop-down switching device may output to the image display unit an instruction signal for canceling synthetic display of a sampled image and extracted image. At the same time, exposure may be so controlled as to set the sampled image to appropriate brightness.

Other Embodiment

The objects of the above-described embodiments are also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described procedures.

As has been described above in detail, according to the image sensing method and apparatus of the embodiments, the focus state of an image sensed by a solid-state image sensing element having a large number of pixels can be confirmed on an image display device having a small number of pixels even for an object with a large brightness difference. The user can manually adjust the focus at a high precision while confirming an entire frame and focus adjustment frame free from any timing difference. The circuit scale does not increase, and even in a synthetic display state, an increase in power consumption and the memory arrangement can be minimized.

In the third embodiment, the focusing area achieves optically proper exposure, and the view angle confirmation image obtains appropriate brightness. This is effective for focusing in still picture photographing.

In the fourth embodiment, the recording image (for confirming a view angle) achieves optically proper exposure, and the focusing area attains appropriate brightness. This is effective for focusing in moving picture photographing.

The fifth embodiment is effective for focusing in still picture photographing when the image exceeds the brightness correction (electrical) range.

In the sixth embodiment, the focusing effect can be further enhanced by setting the view angle confirmation image to appropriate brightness or lower.

The storage medium of the embodiments makes it possible to smoothly control the above-described image sensing apparatus.

As has been described above, the present invention allows quickly, reliably confirming an in-focus state with a simple arrangement.

The present invention is not limited to the above embodiments and various changes and modifications can be made within the spirit and scope of the present invention. Therefore, to apprise the public of the scope of the present invention the following claims are made.

What is claimed is:

1. An image sensing apparatus having a first mode and a second mode, comprising:
    an image sensing unit configured to photo-electrically convert an object image to an image signal;
    a first image generation unit configured to generate a first image obtained from said image sensing unit;
    a second image generation unit configured to generate a second image corresponding to a predetermined region of the first image;
    an AE data acquisition unit configured to acquire each of AE data of the first image and the second image;
    a calculation unit configured to calculate an exposure correction amount and to calculate a brightness correction value;
    a brightness correction unit configured to correct brightness by using the calculated brightness correction value; and
    a display control unit mounted in the image sensing apparatus to display the first image and the second image that are made to have appropriate brightness by said control unit as one frame image,
    wherein, when the first mode is selected, said calculation unit calculates the exposure correction amount based on the AE data of the second image and calculates the brightness correction value based on the calculated exposure correction amount and the AE data of the first image, and said brightness correction unit corrects brightness of the first image based on the calculated brightness correction value, and
    wherein, when the second mode is selected, said calculation unit calculates the exposure correction amount based on the AE data of the first image and calculates the brightness correction value based on the calculated exposure correction amount and the AE data of the second image, and said brightness correction unit corrects brightness of the second image based on the calculated brightness correction value.

2. The apparatus according to claim 1, wherein said first mode is a mode where a still image is sensed and said second mode is a mode where moving images are continuously sensed on the basis of a signal which permits image sensing.

3. The apparatus according to claim 1, further comprising a display control unit adapted to control to display the first image and the second image.

4. The apparatus according to claim 1, wherein said display control unit displays combined image of the first image and the second image.

5. The apparatus according to claim 3, further comprising an image display device adapted to display the image on the basis of the control of said display control unit,
    wherein said image display device displays the image with a number of pixels smaller than a number of pixels of said image sensing unit.

6. The apparatus according to claim 1, further comprising:
    a manual focus function adapted to adjust a focus by manually operating a focus adjustment member; and
    an auto-focus function adapted to adjust the focus by automatically operating the focus adjustment member,
    wherein said display control unit controls to display the first image and the second image after the focus adjustment operation completed.

7. The apparatus according to claim 6, further comprising a switching device adapted to switch a first mode where the focus is automatically adjusted and a second mode where the focus is manually adjusted, wherein said display control unit controls to display the first image and the second image in the case that a mode is set to the second mode by said switching device.

* * * * *